Figure 6:
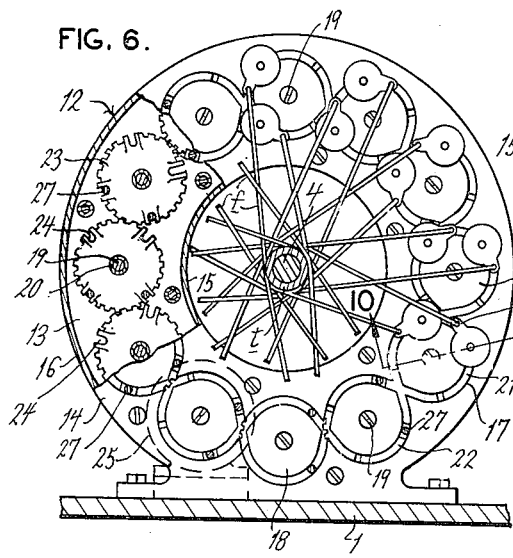

Aug. 28, 1956
J. J. NASH ET AL
2,760,549
METHOD AND APPARATUS FOR MAKING HIGH-PRESSURE
NON-METALLIC TUBING
Filed Jan. 14, 1953
2 Sheets-Sheet 1
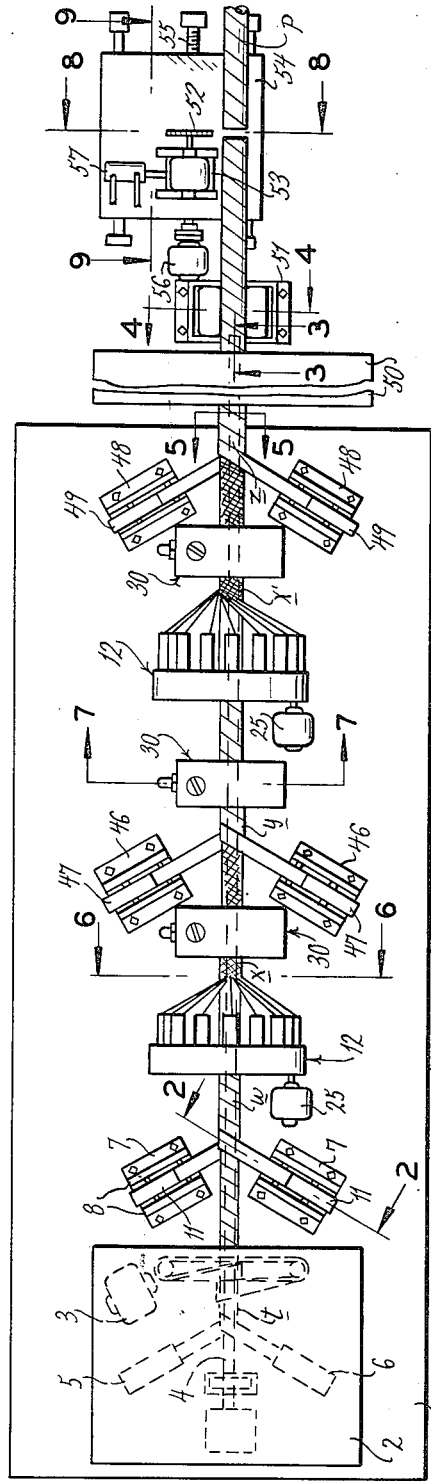
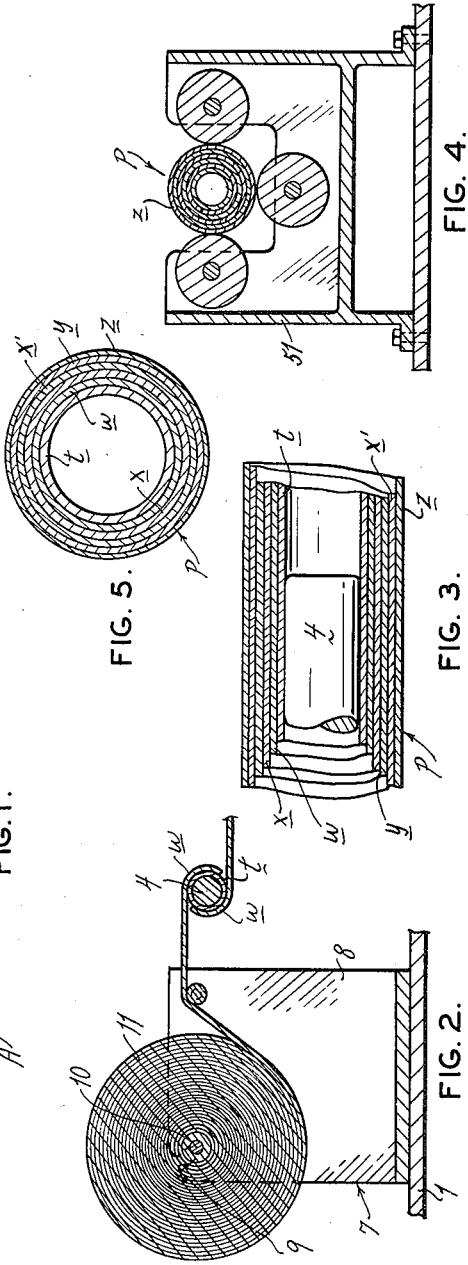
INVENTORS.
JOHN J. NASH
GEORGE A. STEIN
BY
Alfred W. Petchaft
ATTORNEY Aug. 28, 1956 J. J. NASH ET AL 2,760,549
METHOD AND APPARATUS FOR MAKING HIGH-PRESSURE
NON-METALLIC TUBING
Filed Jan. 14, 1953 2 Sheets-Sheet 2

INVENTORS.
JOHN J. NASH
GEORGE A. STEIN
BY
Alfred W. Petchaft
ATTORNEY

United States Patent Office 2,760,549
Patented Aug. 28, 1956

2,760,549

METHOD AND APPARATUS FOR MAKING HIGH-PRESSURE NON-METALLIC TUBING

John J. Nash, Normandy, Mo., and George A. Stein, Cleveland, Ohio, assignors, by mesne assignments, to Korrect-Way Corporation, St. Louis, Mo., a corporation of Missouri, now by change of name to American Fixture, Inc.

Application January 14, 1953, Serial No. 331,212

9 Claims. (Cl. 154—1.8)

This invention relates in general to certain new and useful improvements in high-pressure non-metallic tubing and methods of making the same and is related to application Serial No. 331,213 now Patent No. 2,748,830, filed contemporaneously herewith, and to applications Serial Nos. 288,648 and 288,649 now Patent No. 2,748,831, filed May 19, 1952, by John J. Nash.

As pointed out in the above-mentioned co-pending applications Serial Nos. 288,648 and 288,649, conventional metallic pipe presents a number of technological problems in industrial and related piping installation, such as crude oil gathering systems, subterranean oil and gas pipe lines, and steam and pressure systems employed in certain types of naval vessels to be used as mine sweepers or for similar purposes. These technological fields of application are illustrations of uses in which metallic piping and tubing are found to be unsatisfactory and for which some type of dielectric non-magnetic piping or tubing becomes almost essential.

It is, therefore, one of the primary objects of the present invention to provide a dielectric non-magnetic pipe or tube formed of synthetic materials and which is extremely strong, rigid, and capable of sustaining relatively high internal or bursting pressure and is, therefore, adapted for use in a wide variety of engineering applications for which hitherto only metal piping has been sufficiently strong.

Another object of the present invention is to provide piping or tubing formed of synthetic materials including thermosetting resins.

It is another object of the present invention to provide piping or tubing of the type stated which is initially formed as a spiral winding, the convolutions of which are integrally bonded together by polymerization of thermosetting resins forming a component of the piping or tubing and resulting in an extremely strong, rigid, durable structure.

It is a further object of the present invention to provide a method and apparatus for manufacturing spiral wound synthetic piping or tubing of the type stated.

It is also an object of the present invention to provide apparatus for manufacturing piping or tubing of the type stated in a continuous manner.

In the accompanying drawings (two sheets)—

Figure 10:
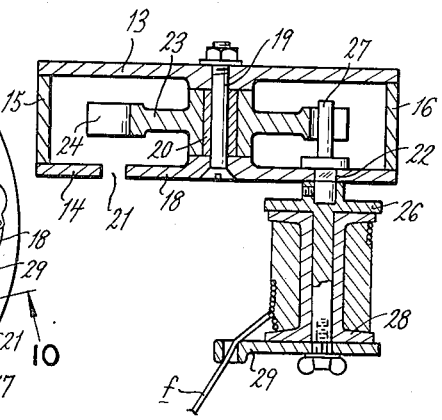
Figure 7:
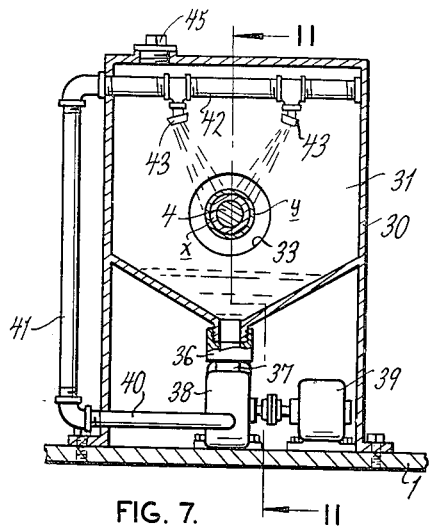
Figure 11:
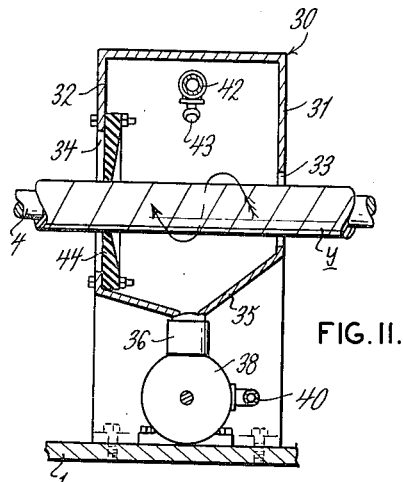

Figure 1 is a top plan view of synthetic pipe manufacturing apparatus constructed in accordance with and embodying the present invention;

Figures 2, 3, 4, 5, 6, 7, 8, and 9 are fragmentary sectional views taken along lines 2—2, 3—3, 4—4, 5—5, 6—6, 7—7, 8—8, and 9—9, respectively, of Figure 1;

Figure 10 is a fragmentary sectional view taken along line 10—10 of Figure 6; and Figure 11 is a fragmentary sectional view taken along line 11—11 of Figure 7.

Referring now in more detail and by reference characters to the drawings, which illustrate a preferred embodiment of the present invention, A designates a synthetic pipe or tube manufacturing machine comprising a rectangular base plate or machine bed 1 conventionally mounted upwardly above, and extending horizontally across, the floor or other suitable supporting structure. Suitably mounted upon the upper face of the base plate 1 (reference being made to the left end of Figure 1) is a conventional tube winding unit 2. Since the tube winding unit 2 may be of any suitable design, it may be schematically designated in Figure 1 by dotted lines, and, as is shown, includes a driving motor 3, a stationary mandrel 4, roll stands 5, 6, for supporting rolls of cardboard tape which are spirally wound on the mandrel and glued to each other to provide a continuous cardboard tube $t$. Also bolted to the base plate 1 on opposite sides of the mandrel 4 forwardly of the tube winding unit 2 are identical roll stands 7, each comprising two spaced parallel vertical plates 8 provided adjacent their upper margins with angularly downwardly extending slots 9 for rotatably supporting a removable shaft 10. Supported upon the shafts 10 of each of the roll stands 7 are rolls of a parting material such as plain or unlacquered cellophane tape 11. As will be seen by reference to Figure 1, the roll stands 7 are disposed at equal and opposite angles with respect to the longitudinal axis of the mandrel 4, so that the webs of tape 11 can be wrapped oppositely around the forwardly progressing and rotating cardboard tube $t$ to form a two-ply spiral winding $w$ which feeds forwardly along with the tube $t$. Preferably the mandrel 4 is provided with a very slight forward taper, that is to say, the forward end is several thousandths of an inch smaller than the rear end, so that the tube $t$ will draw smoothly and continuously along the mandrel 4.

Bolted upon the top face of the base plate 1 and extending vertically upwardly from, and in forwardly spaced relation to, the roll stands 7 is a large conventional circular braiding unit 12 disposed concentrically around the tube $t$ and mandrel 4. The braiding unit 12 comprises a back plate 13 and a front plate 14 separated by cylindrical annular walls 15, 16. The front plate 14 is provided with a plurality of contiguous or tangent circular apertures 17 arranged in a concentric annular series and each provided with a substantially circular insert plate 18 held in place by means of a bolt 19 and tubular bearing sleeve 20 to define two complementary sinuous track slots 21, 22. Operatively mounted above each bearing sleeve 20 is a gear 23 having four equally spaced radial slots 24. All of the gears 23 mesh with each other and one of them is drivingly connected to an electric motor 25. Slidably mounted for movement through the slots 21, 22, is a plurality of spool-holders 26 having pin-like spindles 27 extending inwardly for engagement in the gear slots 24 and being adapted for rotatably supporting spools 28 of fiber-glass roving or low-twist yarn in the provision of a strand or filament $f$ which extends through a thread-guide 29 and is wrapped around the surface of the winding $w$ upon the tube $t$. As the electric motor 25 rotates the gears 23, the several spool-holders 26 are passed from gear to gear and caused to travel along interweaving sinuous paths through the slots 21, 22, thereby applying a layer $x$ of tightly braided fiber-glass strands.

Similarly bolted upon, and extending vertically above, the base plate 1 is a coating tank 30 having front and back walls 31, 32, respectively provided with substantially concentric apertures 33, 34, through which the partially formed pipe continuously passes as it moves along the mandrel 4. The tank 30 is furthermore provided with a centrally depressed hopper-shaped bottom wall 35 connected at its lowest point to a fitting 36, which is, in turn, connected to the intake 37 of a re-circulating pump 38 operatively driven by an electric motor 39 and having a discharge line 40 which is connected by means of a riser 41 to a spray pipe 42 extending horizontally across the top of the tank 30 and is provided with a plurality of spray nozzles 43 directed angularly downwardly upon the partially formed pipe passing therethrough. The tank 30 is partially filled with a supply of a suitable synthetic polyester resin solution which is pumped up to the spray nozzles 43 and sprayed upon the braided layer of fiber-glass strands $x$, thoroughly coating and impregnating this layer with the liquid resin solution. As the coated partially formed pipe travels forwardly through the opening 34, it passes through a resilient squeegeeing collar or annulus 44 which is preferably made of rubber and which removes any excess liquid and returns it to the tank 30 for re-circulation, together with any excess liquid which otherwise runs off after application. The tank 30 is suitably provided with a removable screw plug 45 by which additional liquid may be added to the tank 30 from time to time as needed. It should be noted in this connection that automatic float control liquid supply means may be provided, but this is entirely a conventional expedient, and, since it does not form a part of the present invention, no effort has been made to particularly describe such means.

Similarly mounted on the base plate 1 on opposite sides of the mandrel 4 and forwardly of the tank 30 are roll stands 46 which are substantially identical with the previously described roll stands 7 and support rolls of fiber-glass tape 47, which may be of matted random-fiber construction, or of uni-directional parallel strand construction. Oppositely running webs of tape are fed from the roll stands 46 and are wrapped around the liquid-coated layer $x$ of braided fiber-glass strands to form a spirally wound double-ply layer of fiber-glass fabric $y$.

Similarly mounted upon the base plate 1 forwardly of the roll stands 46 is a second coating tank 30 through which the partially formed pipe passes and in which the layer $y$ is, in turn, impregnated with the polyester resin.

Bolted upon and extending upwardly from the base plate 1 forwardly of the second coating tank 30 is a second braiding unit 12, which is identical in all respects with the previously described braiding unit 12 and functions to apply a second layer $x'$ of braided fiber-glass strands. Forwardly of the second braiding unit 12 is a third coating tank 30 in which the second braided layer $x'$ is impregnated with polyester resin solution.

Finally, the base plate 1 is provided on opposite sides of the mandrel 4 with two roll stands 48, which are substantially identical with the previously described roll stands 7 and 46 and support rolls of cellophane tape 49 for applying a spirally wound two-ply external wrapping $z$ of cellophane tape.

Figure 8:
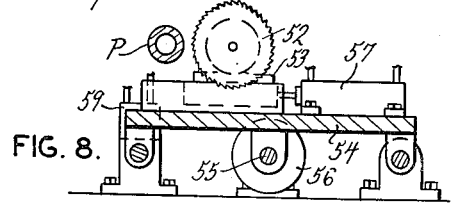
Figure 9:
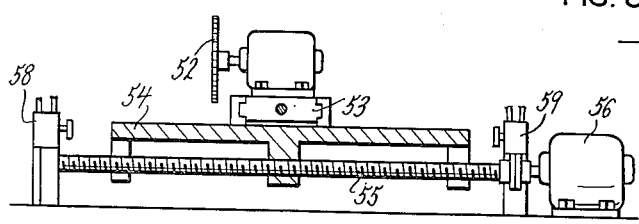

Forwardly of the base plate 1 is a conventional tunnel-type oven 50 through which the completely formed pipe is continuously fed, and beyond the oven 50 is a conventional steady rest 51 and flying cut-off saw 52 mounted in a pneumatically shifted slide 53, which is, in turn, mounted on a traversing table 54 fed to and fro lengthwise of the tube path by a feed screw 55 driven by a reversing motor 56, as shown in Figures 8 and 9. The slide 53 is actuated by a pneumatic cylinder 57, which is controlled by two valves 58, 59, located at opposite ends of the traversing table 54 and are actuated by impact therewith to shift the slide 53 away from the finished pipe P as the table 54 reaches the forward end of its stroke and to shift it in toward the finished pipe P as the traversing table 54 reaches the rearward end of its stroke. The valve system is conventional and is, therefore, not described in detail. The speed of the reversing motor 56 and the pitch of the feed screw 55 are such that, during forward movement, the traversing table 54 will have the same speed as the forward speed of the finished pipe P and the length of the path of movement of the traversing table 54 will determine the length of the section of finished pipe P which is cut off during each stroke.

After the sections are cut off, they will consist of an inner cardboard tube, an inner double-ply parting layer of cellophane tape, the several built-up layers of now consolidated and polymerized resin fiber-glass pipe, and an external two-ply covering layer of cellophane tape, as diagrammatically shown in Figure 5. Cellophane is one of a group of unique films which have the property of shrinking somewhat when heated. Thus, when the wrapping $w'$ is exposed to heat in the oven, as will presently be more fully described, it tends to shrink and applies substantial pressure to the laminate structure during polymerization. Thus, to finish the section of synthetic pipe, it is simply necessary to remove, in any suitable manner, the exterior cellophane wrapping and the interior cardboard tube and cellophane parting layer. It has been found in connection with the present invention that even after heat curing or polymerization, the cellophane tape is readily separable from the synthetic tubing and, consequently, the external wrappings and internal cardboard tubing can be very quickly and conveniently removed, leaving a clean bore rigid section of plastic pipe.

Actual field tests with synthetic pipe constructed in accordance with the present invention have revealed that the material has practically no affinity for the wax, paraffin, and tars usually present in crude oil and, therefore, can be used in a crude oil gathering system for months on end without accumulating a bore-reducing internal layer or deposit of paraffin, wax, and the like. Pressure tests have shown that synthetic pipes and tubing made in accordance with the present invention have a bursting strength comparable to that of metallic pipes and tubes of similar weight, size, and thickness and are, therefore, entirely satisfactory for use in shipboard steam-pipe installation and the like.

In addition to this, field tests have also shown that synthetic pipes made in accordance with the present invention are electrolytically inert when buried beneath the earth or submerged beneath a body of water in the manner of conventional pipe and gas lines and, therefore, can be used for pipeline purposes without wrapping or other electrolysis-preventing expedients and affords every indication of extremely long life and durability in this type of engineering application.

Other strands, such as ceramic, metallic and organic textile fibers and synthetic resins, which are compatible therewith, may be used instead of the fiber glass and polyester resin materials hereinbefore specifically mentioned, and it should be understood that changes and modifications in the form, construction, arrangement, and combination of the several parts of the high-pressure non-metallic tubing and in the steps of its production may be made and substituted for those herein shown and described without departing from the nature and principle of our invention.

Having thus described our invention, what we claim and desire to secure by Letters Patent is:

1. The method of forming non-metallic tubing which comprises forming a spiral winding of cardboard tape upon a mandrel to form thereon a continuous cardboard tube, feeding the tube progressively along the mandrel in the direction of the longitudinal axis of the mandrel, continuously applying a winding of parting material to the tube so that the winding will move with the tube, braiding a plurality of fiber glass strands to form a braided layer, applying a liquid film of unpolymerized resin to said last named layer, applying a spiral winding of non-woven glass-fiber tape externally upon the layer formed by the braided strands, applying a liquid film of unpolymerized resin to said last named winding, and heat curing the resin to form a resin bonded cylindrical tube.

2. The method of forming non-metallic tubing which comprises forming a spiral winding of cardboard tape upon a mandrel to form thereon a continuous cardboard tube, feeding the tube progressively along the mandrel in the direction of the longitudinal axis of the mandrel, continuously applying a winding of parting material to the tube so that the winding will move with the tube, braiding a plurality of fiber glass strands to form a braided layer, applying a liquid film of unpolymerized resin to said last named layer, applying a spiral winding of matted fiber glass tape extending upon the layer formed by the braided strands, applying a liquid film of unpolymerized resin to said last named winding, and heat curing the resin to form a resin bonded cylindrical tube.

3. The method of forming non-metallic tubing which comprises forming a spirally wound self-supporting cardboard tube upon a mandrel, feeding the tube progressively along the mandrel in the direction of the longitudinal axis of the mandrel, continuously applying a spiral winding of cellophane tape to the tube so that the winding will move with the tube, braiding a plurality of fiber glass strands to form a braided layer, applying a liquid film of unpolymerized resin to said last named layer, applying a spiral winding of non-woven glass fiber tape externally upon the layer formed by the braided strands, applying a liquid film of unpolymerized resin to said last named winding, and heat curing the resin to form a resin bonded cylindrical tube.

4. The method of forming non-metallic tubing which comprises spirally winding a continuous web of cardboard tape to form thereon a cardboard tube, feeding the tube progressively along the mandrel in the direction of the longitudinal axis of the mandrel, continuously applying a winding of parting material to the tube so that the winding will move with the tube, applying a single layer of braided fiber glass strands, applying a liquid film of unpolymerized polyester resin to said layer after it has been formed, applying a spiral winding of matted fiber glass tape externally upon the layer formed by the braided strands, applying a liquid film of unpolymerized polyester resin to said last named winding after it has been formed, applying an external spiral winding of parting material upon the external surface of the last named resin coated winding, heat curing the resin to form a resin bonded cylindrical tube and removing the continuous web of cardboard tape and the winding of parting material applied to said cardboard tube to thereby leave a clean bore rigid section of plastic pipe.

5. The method of forming non-metallic tubing which comprises spirally winding a continuous web of cardboard tape upon a mandrel to form thereon a continuous cardboard tube, feeding the tube progressively along the mandrel in the direction of the longitudinal axis of the mandrel, continuously applying a winding of cellophane tape to the tube so that the winding will move with the tube, braiding a single layer of fiber glass strands around the tape covered tube, applying a liquid film of unpolymerized polyester resin to said layer after it has been formed, applying a spiral winding of matted random-laid fiber glass tape externally upon the layer formed by the braided strands, applying a liquid film of unpolymerized polyester resin to said last named winding after it has been formed, spirally winding a continuous length of cellophane tape tightly upon the external surface of the last named resin coated winding, and heat curing the resin in a single curing operation to form a unitary resin bonded cylindrical tube.

6. The method of forming non-metallic tubing which comprises spirally winding a continuous web of cardboard tape upon a mandrel to form thereon a continuous cardboard tube, feeding the tube progressively along the mandrel in the direction of the longitudinal axis of the mandrel, continuous applying a winding of parting material to the tube so that the winding will move with the tube, braiding a single layer of fiber glass threads around the tape covered tube, applying a liquid film of unpolymerized polyester resin to said layer after it has been formed, applying a spiral winding of matter fiber glass tape externally upon the layer formed by the braided threads, applying a film of unpolymerized resin to said last named winding after it has been formed, heat curing the resin to form a resin bonded cylindrical tube, and removing the internal spirally wound tube of cardboard tape material and the winding of parting material thereon.

7. The method of forming non-metallic tubing which comprises spirally winding a continuous web of cardboard tape upon a mandrel, feeding the tube progressively along the mandrel in the direction of the longitudinal axis of the mandrel, continuously applying a spiral winding of parting material to the tube so that the winding will move with the tube, braiding a first single layer of fiber glass strands around the winding of parting material, applying a liquid film of unpolymerized polyester resin to said layer after it has been formed, applying a spiral winding of matted fibers externally upon the layer formed by the braided strands, applying a liquid film of unpolymerized polyester resin to said last named winding after it has been formed, braiding a second single layer of fiber glass strands upon the winding of matter fibers, applying a film of unpolymerized polyester resin to the last named layer after it has been formed, and heat curing the resin to form a unitary resin bonded cylindrical tube.

8. A machine for manufacturing plastic tubing comprising an elongated stationary mandrel of substantially circuit cross-sectional shape, means for forming a spirally wound tube upon the mandrel and causing said tube simultaneously to rotate around and travel longitudinally along the mandrel, means for applying a film of parting material upon the tube, a first braiding machine located annularly around the mandrel for braiding a plurality of fibrous strands upon the film of parting material to form a first layer consisting of braided material, first applicator means located along the mandrel in lengthwise spaced relation to the first braiding machine for coating said layer with an unpolymerized liquid resin, means for winding a second layer consisting of nonwoven fibrous fabric upon said first layer, second applicator means located along the mandrel in lengthwise spaced relation to the first applicator means for coating said layer with an unpolymerized liquid resin, a second braiding machine located annularly around the mandrel and spaced lengthwise therealong in relation to the second applicator means for braiding a plurality of fibrous strands upon the second layer to form a third layer consisting of braided material, third applicator means located along the mandrel in lengthwise spaced relation to the second braiding machine for coating said third layer with an unpolymerized liquid resin, and means for curing the resin.

9. A machine for manufacturing plastic tubing comprising an elongated stationary mandrel of substantially circular cross-sectional shape, means for forming a spirally wound tube upon the mandrel and causing said tube simultaneously to rotate around and travel longitudinally along the mandrel, means for applying a film of parting material upon the tube, a first braiding machine located annularly around the mandrel for braiding a plurality of fibrous strands upon the film of parting material to form a first layer consisting of braided material, first applicator means located along the mandrel in lengthwise spaced relation to the first braiding machine for coating said layer with an unpolymerized liquid resin, means for winding a second layer consisting of nonwoven fibrous fabric upon said first layer, second applicator means located along the mandrel in lengthwise spaced relation to the first applicator means for coating said layer with an unpolymerized liquid resin, a second braiding machine located annularly around the mandrel and spaced lengthwise therealong in relation to the second applicator means for braiding a plurality of fibrous strands upon the second layer to form a third layer consisting of braided material, third applicator means located along the mandrel in lengthwise spaced relation to the second braiding machine for coating said third layer with an unpolymerized liquid resin, and means for curing the resin, said several winding and coating means being located at successively spaced positions along the mandrel.

References Cited in the file of this patent

UNITED STATES PATENTS

| | | |
|---|---|---|
| 2,006,826 | Elliot | July 2, 1935 |
| 2,232,524 | Hackbarth | Feb. 18, 1941 |
| 2,402,038 | Goldman et al. | June 11, 1946 |
| 2,454,625 | Bondon | Nov. 23, 1948 |
| 2,552,599 | Stout | May 15, 1951 |
| 2,611,721 | Brees | Sept. 23, 1952 |
| 2,614,058 | Francis | Oct. 14, 1952 |
| 2,643,700 | Havens | June 30, 1953 |
| 2,691,694 | Young | Oct. 12, 1954 |